United States Patent [19]

Kershaw et al.

[11] 3,891,577

[45] June 24, 1975

[54] PROCESS OF PREPARING VESICULATED POLYMERS

[75] Inventors: Robert William Kershaw, South Blackburn; Frederick John Lubbock, Beaumaris; Livia Polgar, Caulfield, all of Australia

[73] Assignee: Balm Paints Limited, Melbourne, Australia

[22] Filed: Dec. 1, 1970

[21] Appl. No.: 94,171

[30] Foreign Application Priority Data
Dec. 1, 1969 Australia............................ 64565/69

[52] U.S. Cl........... 260/2.5 R; 106/122; 117/124 E; 260/2.5 BD; 260/2.5 M; 260/2.5 F; 260/2.5 EP; 260/2.5 N; 260/2.5 HB; 260/8; 260/17 A; 260/29.6 RB; 260/29.6 RW; 260/42.32; 260/42.53; 260/829; 260/836; 260/837 R; 260/851; 260/859; 260/862; 260/874; 260/881; 260/885; 260/886; 260/895; 260/898
[51] Int. Cl. ............................................. C08f 47/08
[58] Field of Search ........ 260/2.5 R, 2.5 M, 2.5 BD; 106/122

[56] References Cited
UNITED STATES PATENTS

| | | | |
|---|---|---|---|
| 2,858,570 | 11/1958 | Richards | 260/2.5 R |
| 2,884,387 | 4/1959 | Bieber et al. | 260/2.5 M |
| 3,536,638 | 10/1970 | Dosmann | 260/2.5 M |

*Primary Examiner*—Wilbert J. Briggs, Sr.
*Attorney, Agent, or Firm*—Cushman, Darby & Cushman

[57] ABSTRACT

A process of preparing vesiculated polymer by converting to solid polymer a liquid medium in which is dispersed particles of a second polymer swollen by a liquid swellant, the swellant then being removed to provide vesicles in the solid polymer. Granular vesiculated polymer may be prepared by carrying out the process on a liquid medium which is itself pre-dispersed in a suspending liquid in which it is insoluble.

7 Claims, No Drawings

PROCESS OF PREPARING VESICULATED POLYMERS

This invention relates to a process of preparing vesiculated polymer, to vesiculated polymer so-produced and to uses of the vesiculated polymer.

By vesiculated polymer we mean polymer which comprises a plurality of cells or vesicles, each vesicle ideally being encased in a complete shell of polymer; that is, the polymer does not have a continuous porosity extending from one cell to its neighbour, but comprises a plurality of isolated vesicles. There may be present a minor proportion of imperfect vesicles in which some of the polymer shell has either not formed or has been broken away allowing entry from one vesicle to another.

We have found that it is possible to prepare vesiculated polymer of unusually uniform and pre-determined vesicle size; when such polymer is prepared in particulate form it is particularly well suited for use as an opacifying agent in coatings and polymer films. We provide a process of preparing vesiculated polymer by converting to a solid polymer a liquid medium in which is dispersed particles of another polymer swollen by a liquid swellant, the liquid swellant then being at least partially removed from the disperse polymer particles.

The liquid medium may be converted to a solid by removal of solvent, e.g. from a solution of a solid polymer, or preferably by polymerisation of a monomer or comers or an oligomer or a mixture of these. Optionally a dissolved polymer may be present in the liquid to be polymerised.

It is a particular advantage of this process that it enables the size of the vesicles formed in the polymer to be pre-determined and controlled with precision. Furthermore, by the use of this process substantially uniform vesicles having a hitherto unachievable diameter as small as 0.05 micron can be formed. The vesicles so-formed may consist essentially of air although they will also comprise residues of initially swollen but now collapsed polymer and possibly a residue of swellant. The vesiculated polymer may be pigmented, which simply requires conventional pigmentation of the liquid medium. Optionally, when they are of a suitable size the vesicles may also contain some particulate solids.

In one embodiment of the process of this invention a polymer is dispersed in the liquid medium, the diameter of the dispersed polymer particles being smaller than the required vesicle size, liquid swellant for the polymer then being added to the dispersion until the size of the dispersed particles which imbibe the swellant increases to the required vesicle diameter. Alternatively, the polymer particles may be swollen before they are dispersed in the liquid medium. Solidification of the liquid in which the swollen polymer particles are dispersed and removal of the swellant is then carried out to provide the vesiculated polymer, which may be in massive form, as a film, or in the form of a coating applied to a substrate.

In another embodiment of the process of the invention the dispersion of polymer in the liquid medium may itself be dispersed in a further liquid in which it is insoluble. We refer to the further liquid as the suspending liquid. Solidification of the medium is then carried out and after separation of the granules soformed from the suspending liquid, liquid swellant may be removed from the swollen polymer to provide vesiculated polymer in granular form. Alternatively when, for example, the vesiculated granules are to be used in a coating composition with which the suspending liquid is compatible, the granules formed by solidification of the medium may be incorporated into the composition as a slurry in at least part of the suspending liquid. On applying the composition to a substrate, formation of a coating film and removal of swellant from the swollen disperse polymer to form the vesicles within the granules then takes place concurrently. The suspending liquid may consist of or contain the liquid swellant which swells the particles of polymer dispersed in the liquid medium. This embodiment provides a particularly convenient way of preparing vesiculated polymer granules in which the diameters of both the granules and the vesicles is controlled.

The relationship between the liquid medium which is to be solidified and the swellable dispersed polymer and between the liquid medium and the suspending liquid is essentially one of insolubility. The requirements for insolubility are well known in the art, a basic factor being that the two materials be of different polarities or polarisabilities. The swellable polymer will, therefore, be of different polarity or polarisability to the liquid medium in which it is to be dispersed. In turn, the liquid medium will be of different polarity or polarisability to that of a suspending liquid in which it is to be dispersed to prepare vesiculated granules. The swellable polymer will usually, therefore, be of similar polarity or polarisability to that of the suspending liquid and indeed this is a requirement if the dispersed polymer is to be swellable by the suspending liquid or a component thereof. The swellant and swellable polymer will be of similar polarity or polarisability.

Stated broadly, the range of compositions which will satisfy the above relationship is defined at one extreme by the combination of a water swellable polymer and aqueous liquid swellant with a non-polar medium to be solidified and at the other extreme by the combination of a hydrocarbon swellable polymer and liquid hydrocarbon swellant with a polar medium to be solidified. The above processes are not restricted to the use of such limiting compositions alone, however, the essential requirement being only that the difference in polarities or polarisabilities of the chosen liquid medium, swellable polymer, swellant and, when present, suspending liquid shall be such that the swollen disperse polymer remains insoluble in the medium to be solidified and that the medium in turn remains insoluble in the suspending liquid.

If the medium to be solidified is a solution of a polymer from which solvent is to be removed to effect solidification, typical non-polar or moderately polar media are, for example, solutions of:

cyclised rubber, chlorinated diphenyls and coumarone-indene resins in aliphatic hydrocarbons;

cyclic ketone resins and pentaerythritol esters of maleic/rosin adducts and chlorinated rubber in aliphatic/aromatic hydrocarbon blends; and chlorinated rubber, phenol/formaldehyde condensates, poly(styrene/butadiene), polymers of styrene, α-methyl styrene, vinyl toluene and methyl methacrylate in aromatic hydrocarbons.

More polar media to be solidified include, for example, solutions of:

polymers of lower saturated alcohol esters, e.g. methyl, ethyl and n-butyl esters of unsaturated monobasic acids, e.g. acrylic and methacrylic acid in mixtures of aromatic hydrocarbons and alcohols;

nitrocellulose and cellulose acetate/butyrate in mixtures of aromatic hydrocarbons and ketones;

polymers of vinyl acetate/vinyl chloride and vinylidene chloride in dioxane and ethylene dichloride;

poly(vinyl butyral) and shellac in ethanol;

glycerol/phthalic acid co-condensates in methanol; and poly(vinyl formal/butyral) and polymers of acrylonitrile in N,N-dimethyl formamide.

If the medium to be solidified is a polymerisable monomer, suitable monomers, used either alone or in combination, may be selected from $\alpha,\beta$-ethylenically unsaturated monomers polymerisable by a free radical initiator, for example:

olefines, e.g. ethylene, isoprene and butadiene;

aromatic substituted ethylenes, e.g. styrene, $\alpha$-methyl styrene and 'vinyl toluene'; vinyl esters and halides, e.g. vinyl acetate, vinyl chloride, vinyl fluoride and vinylidene chloride;

unsaturated monobasic acids and their saturated alcohol esters, e.g. acrylic and methacrylic acids and their methyl, ethyl and n-butyl esters;

unsaturated amides and nitriles, e.g. acrylamide, methacrylamide and acrylonitrile; and unsaturated polybasic acids, their esters and acid esters, e.g. maleic and fumaric acids and their ethyl, n-butyl and 2-ethyl hexyl esters.

Monomers which would produce polymers of glass transition temperature below ambient temperature may be cross-linked by co-polymerisation with a proportion of suitable polyfunctional co-monomers, e.g. divinyl benzene and ethylene glycol dimethacrylate.

The medium to be solidified may comprise precursor elements, e.g. oligomers, polymerisable intermediates or mixtures thereof with polymerisable monomers, which react to form solid polymer. Optionally there may also be present a proportion of solvent or liquid. For example, the medium may comprise a combination of an oligomer or polymer containing epoxide groups with a polyamide containing epoxy-reactive amine groups. Alternatively, the medium may be an aqueous syrup of a urea/formaldehyde or melamine/formaldehyde condensate heat convertible to polymer. The medium may be, for example, a solution of a butylated malemaine/formaldehyde resin and a hydroxylated poly(meth)acrylate polymer with which it is reactable, in a minor proportion of a hydrocarbon/alcohol liquid. Another suitable medium is a hydroxylated oligomer in combination with a polyfunctional isocyanate. A further useful alternative medium is a solution of an unsaturated polyester, e.g. an ethylene glycol/maleic anhydride co-condensate in a polymerisable monomer, e.g. styrene.

Due regard must be paid in selecting the polymer to be formed by solidification of the medium to the conditions of temperature and mechanical stress to which it will be subjected in use. For example, vesiculated polymer which has a glass transition temperature substantially lower than that at which it is intended to be used may be irreversibly distorted and lose its characteristic vesiculated structure when so-used. In general, we have found that when vesiculated polymer granules are to be used as components of paints, good abrasion resistance is provided by the use in the granules of polymer which has an elongation at break of the order of 40% or less. A useful control over the toughness and hardness of the granules can be exercised by cross-linking the polymer forming the granules, which may conveniently be done during solidification of the medium.

The polymer to be dispersed in the liquid medium must be insoluble in that medium and remain so when it is swollen by liquid swellant. In general, the solubilities and insolubilities of polymers and liquids are well known in the polymer art and as mentioned above, it will usually be necessary for the medium and disperse polymer, especially when swollen, to be of different polarity or polarisability to meet this requirement.

The nature of the liquid swellant is related to the nature of the disperse polymer. Typical nonpolar or moderately polar polymers swellable by aliphatic or aromatic hydrocarbons are, for example, polymers of isoprene, styrene, $\alpha$-methyl styrene, 'vinyl toluene' and butadiene;

polymers of higher alkyl esters of acrylic acid, methacrylic acid and vinyl alcohol, e.g. lauryl and dodecyl(meth) acrylate, vinyl alcohol esters of tert-branched-chain $C_{9-11}$ aliphatic monocarboxylic acids, vinyl stearate and vinyl linoleate; and styrene/acrylic terpolymers.

More polar polymers swellable by aromatic hydrocarbons or aromatic hydrocarbon blends with alcohols, polymers of lower alkyl esters of acrylic acid, methacrylic acid and vinyl alcohol, e.g. methyl, ethyl and n-butyl esters of (meth)acrylic acid, vinyl acetate and vinyl propionate.

Typical highly polar polymers swellable by water or aqueous liquid, that is water containing a minor proportion of a water-soluble organic liquid, include for example:

polymers of vinyl pyrrolidone, ethylene oxide, vinyl alcohol, acrylamide and quaternary ammonium monomers, e.g. vinyl pyridine and dimethyl aminoethyl (meth) acrylate quaternised with benzyl chloride.

Further highly polar polymers swellable by water are polymers which contain an ionisable group, e.g. an acid group such as a carboxyl, sulphonic and phosphonic group or a basic group, e.g. an amine. Suitable monomers for introducing acid groups into addition polymers include, for example, acrylic, methacrylic, vinyl sulphonic, vinyl phosphonic and styrene sulphonic acids, vinyl hydrogen phosphate, maleic anhydride and partial phosphoric acid esters of hydroxy iso-propyl methacrylate. Monomers for introducing basic groups into addition polymers include, for example, vinyl pyridine, N,N-dimethyl aminoethyl(meth) acrylate and tert-butyl amino-ethyl (meth)acrylate.

Polymers containing ionisable acid groups may be swollen by water at pH values greater than 7, e.g. water containing ammonia or preferably a low molecular weight amine. Polymers containing ionisable basic groups may be swollen by water at pH values less than 7, e.g. water containing hydrochloric or formic acid.

The choice of suitable components for the performance of the process of this invention is further illustrated by the following non-limiting examples:

| Medium | Dispersed Polymer | Swellant | Susp.liquid (optional) |
|---|---|---|---|
| Coumarone/indene resin soln. in aliphatic hydrocarbon | poly(vinyl pyrrolidone) | water | water |
| styrene monomer | poly(vinyl pyrrolidone) | water | water |
| unsat.polyester soln.in styrene | quaternised acrylate copolymer | water | water |
| epoxy resin/amine | poly(lauryl methacrylate) | aliphatic hydrocarbon | water |
| polyol oligomer/ polyisocyanate | poly(lauryl methacrylate) | aliphatic hydrocarbon | aliphatic hydrocarbon |
| melamine/formaldehyde aqueous syrup | poly(vinyl acetate) | xylene | aliphatic hydrocarbon |
| urea/formaldehyde aqueous syrup | poly(styrene) | xylene | mineral spirits |

The dispersion of swellable polymer in the medium to be solidified can be prepared by dispersing pre-formed polymer particles in the medium, preferably in the presence of a stabiliser for the dispersion. For example, particles of polystyrene can be dispersed in a medium consisting of a solution of a water-soluble syrup of a urea/formaldehyde condensate in water by conventional mechanical means.

A particularly suitable method of making the swellable polymer particles is to prepare them by dispersion polymerisation. The stabiliser used in the dispersion polymerisation is preferably one which will also stabilise the polymer particles in the liquid medium to be solidified. The dispersion polymerisation may be carried out in an organic liquid which the monomer is soluble and the resulting polymer is insoluble in the liquid containing a stabiliser for the particles of polymer formed by the polymerisation. Suitable polymerisation processes of this type are described, for example, in British Pat. Specifications Nos. 941305, 1052241, 1123611, 1122397 and 1143404. Dispersion polymerisation processes are particularly useful not only because of the control available over particle size but also because the polymer particles are stabilised in a liquid of different polarity, that is a liquid of the same or similar polarity to that of the medium used in this invention to make the vesiculated polymer. In this case the stabiliser used in the dispersion polymerisation which forms the polymer particles will serve to stabilise them when added to and dispersed in the liquid medium to be solidified. Alternatively, the particles may be formed by precipitating or flushing pre-formed polymer into an organic liquid containing a stabiliser for the disperse particles so-formed.

The swellable polymer particles may also be made be aqueous emulsion polymerisation and the resulting latex added to a water miscible medium to be solidified. As a further alternative the latex may be dried and the dried particles re-dispersed in the liquid medium by use of a stabiliser as described in French Pat. Specification No. 93,606.

Where dispersions of swellable polymer particles are added to the liquid medium these dispersions may conveniently contain about 10–60% by weight of dispersed polymer.

Swelling of the polymer particles may be carried out simply by incorporating a controlled proportion of liquid swellant in the polymer before it is dispersed in the liquid to be solidified. Another suitable method is to form a dispersion of the polymer to be swollen in the liquid medium and then to swell the disperse polymer particles by the controlled addition of swellant to the dispersion.

The medium to be solidified may be partially solidified before the swellable polymer particles are swollen provided, of course, that swelling takes place either before the liquid is converted to solid polymer or at temperatures above Tg of any solid polymer formed. When vesiculated granules are being prepared the suspending liquid may be the source of liquid swellant for the disperse polymer particles and when this is so dispersion in the suspending liquid of the medium containing disperse polymer and swelling of the disperse polymer may be carried out concurrently. All of these processes provide control of the size of the vesicles which ultimately form in the polymer formed by solidifying the medium.

It is an important feature of the process of this invention that the size of the vesicles can readily be controlled by control of the particle size and/or the degree of swelling of the polymer particles dispersed in the medium to be solidified.

For example, when the polymer particles are prepared by dispersion polymeriation, means for controlling the particle size of disperse polymer soprepared are well known. The degree of swelling of the polymer particles can be controlled by:

a controlled degree of cross-linking of the polymer, thus restricting the extent to which the swollen polymer can be extended by the swellant;

having present in the medium to be solidified a soluble material which partially counterbalances to a predetermined degree osmotic pressure developed in the swollen particles; adjustment of pH value where the particle is of ionisable polymer to be swollen by water.

The useful size and concentration of the swellable disperse polymer particles and hence of the vesicles themselves to be used in the compositions of this invention depends on the desired physical nature of the vesiculated polymer which is being prepared. Bearing in mind such practical requirements as the provision of adequate mecahnical strength in the vesiculated polymer we have found that in general the vesicles should provide from 5–75% of the total volume of the vesiculated polymer and when the vesicles are required primarily to impart opacity to the polymer we prefer that the vesicles should have diameters of from 0.015 to 20 micron, more preferably from 0.03 to 1.0 micron. Typical sizes of swellable polymer particles useful in the process of this invention to achieve the preferred range of vesicle sizes are from 0.01 to 10 micron according to the degree of swelling of the particles.

When the vesiculated polymer is to be used in massive form, for example, as a moulding or a rod, the size of the vesicles may be dictated by the required density and/or mechanical strength which the vesiculated polymer is to have. When this is so, it may be desirable to exceed the preferred upper limit of 20 micron vesicle diameter. However, in general we have found that superior mechanical strength is achieved with vesicles below 20 micron diameter, the density being adjusted by selection of the total vesicle volume.

If the vesiculated polymer is to be used in the form of a polymer sheet or a coating film on a substrate, the maximum diameter of the swollen polymer particles should be less than and preferably less than half of the thickness of the sheet or film, to avoid the formation of a high proportion of imperfect vesicles.

When the vesiculated polymer is made in granular form for use as opacifying agents in paint and polymer films there must, on average, be more than one vesicle per granule. The granules may range in size from 0.1 to 500 micron diameter and the preferred vesicle volume is from 10 to 50% of the granule volume. While in practice we have found that this can be achieved by the use of swellable polymer particles in the range of 0.01 to 5.0 micron according to the size of the granule and the degree of swelling of the particles, in order to achieve our preferred range of vesicle sizes of from 0.03 to 1.0 micron, we prefer the swellable particles to be within the size range of 0.02 to 0.6 micron.

When it is desired to achieve a high vesicle content of greater than 50% by volume, this can be done by close packing of vesicles in a range of sizes, small ones dispersed in the interstices between larger ones. This can be achieved using a corresponding range of sizes of swellable particles.

Where the vesicles are to contain other materials, such as pigment, insecticides, algicides, fungicide, pharmaceuticals, metal flakes and powders, particles of these materials may be encapsulated in the swellable polymer by the process described in British Pat. Specification No. 1,156,653, the encapsulated particles then being used to create the vesicles by dispersion in the liquid medium.

Other materials may also be incorporated in the polymer in which the vesicles are embedded. Where they are solid they may be dispersed in the liquid medium by conventional techniques, but it is preferable that the stabiliser for the disperse solids be compatible with the stabiliser for the swellable polymer particles in the medium.

When making vesiculated polymer granules, the droplets of medium to be solidified may be suspended in the suspending liquid using conventional colloids and surface active agents known in the emulsion art. Where the suspending liquid is non-aqueous the droplets of medium may be suspended using the stabilising agents described in French Pat. Specification No. 1,543,838.

The vesiculated polymer granules of this invention may be used as low-density fillers and opacifiers in plastics mouldings, polymer films and paper. For these purposes we prefer to use granules of thermoset or cross-linked polymer which are particularly useful in proportions of up to 25% by volume in the compositions.

When so-used as fillers the vesiculated granules preferably have a diameter of 50 micron maximum, their opacifying effect being greatest at diameters of up to 5 micron.

Furthermore, they are particularly useful as matt texturing, flatting and opacifying agents in paint compositions. Granules having a mean diameter of 50 to 500 micron or more can be used to obtain texturing effects in paint films while, in general, if the mean particle diameters of the granules lie within the range of 1 to 100 micron the texturing effect is less pronounced and the granules can be used to obtain an opacifying and matting effect in matt and semi-matt paints. For the best results in matt paints, especially matt aqueous latex paints, we prefer that the granules should be essentially of from 1 to 50 micron diameter and with a volume average diameter of from 5 to 35 micron. The volume average diameter is defined by the expression $$\Sigma V^i d^i$$

where $V^i$ is the volume fraction of all particles of diameter $d^i$.

Matt paints comprising granules of lower volume average diameter than 5 micron tend to exhibit glossiness in the applied paint film and if the volume average diameter exceeds 50 micron the surface appearance of the film is marred by coarse particles which disrupt the otherwise uniform matt surface.

Granules with a diameter within the range 0.1 to 5 micron are particularly useful in gloss and semi-gloss paints. By reason of their vesiculated structure such granules impart opacity to paint films in which they are embedded. In contrast to the use of conventional opacifying pigments this opacity is gained without significantly increasing the density of the film which, for some applications in particular, e.g. paper coatings, can be an important advantage. The maximum acceptable vesicle diameter will, of course, depend on the average diameter of the vesiculated granule but we have found that the opacifying effect is related to the diameter of the individual vesicles, the optimum light scattering effect of vesicles containing air being achieved in the range of about 0.2 to 0.5 micron diameter.

It is an important feature of our invention that when the vesiculated polymer granules are suitably sized they can be used to opacify a glossy paint film without detracting from its surface gloss; typically at granule diameters of less than about 1 micron. On the other hand, by the choice of somewhat coarser granules both the opacity and surface gloss of the compositions can be controlled in a predictable manner; the coarser the granules the lower the achievable gloss.

Furthermore, because the granules and the paint film-forming polymer may have different physical characteristics, the granules can be used to regulate the overall mechanical properties of a film in which they are incorporated. For example, the use of relatively hard vesiculated granules can be used to increase the hardness and abrasion resistance of a film.

The paints may be prepared by stirring vesiculated granules into a conventional paint formulation comprising film-forming polymer and optionally pigment, typically to a maximum granule volume concentration based on the total solids of the paint of 55%. the granules must be substantially insoluble in the paint composition, although in practice we have found that some minor degree of swelling of the granules by solvents in the paint can be tolerated, provided they do not lose their characteristic vesiculated structure. The resistance to solution or swelling of the vesiculated granules in the paint composition is conveniently increased by selecting thermo-set or cross-linked polymer granules.

It is not necessary, however, to use vesiculated polymer of the invention in the form of granules to prepare opaque gloss or semi-gloss paints. When the swollen polymer is dispersed in a film-forming paint composition, that is, a medium comprising a solution or dispersion of materials (optionally pigmented) which on soldification will deposit a polymeric film on a substrate, the particles of swollen polymer trapped within the film, on removal of swellant, form a coating film of vesiculated polymer. In this embodiment of our invention the liquid swellant must be sufficiently volatile to diffuse from the film at the temperature at which it is to be formed and the vesicles should have a diameter within the size range of 0.03 to 1.0 micron.

Furthermore, the medium must reach a sufficiently immobile gel stage before loss of swellant causes the swollen disperse polymer particles to collapse to ensure that vesicles of the required size form in the film. For example, if the medium consists of a solution of film-forming polymer in suitable solvents, which solidifies by loss of solvent, the solvents must volatilise from the film more quickly than the swellant of the disperse polymer.

The proces of our invention provides a direct method of selecting both the size of the vesicles formed in the paint film to impart opacity to it and the volatility of the liquid swellant for the disperse polymer particles.

The invention is illustrated by the following examples in which all parts are expressed by weight:

EXAMPLE 1

Preparation of vesiculated granules of poly(styrene/-divinyl benzene) by an emulsification process using an aqueous swellant and suspending liquid. The medium is solidified by an addition polymerisation reaction.

A non-aqueous latex of poly(vinyl pyrrolidone) was prepared by the dispersion polymerisation of vinyl pyrrolidone in an aliphatic hydrocarbon liquid (boiling point 100°C) in the presence of a graft copolymer stabiliser used as a 44% by weight solids solution in a 1:1 by weight mixture of benzene and toluene. The graft copolymer consisted of a backbone of poly(vinyl pyrrolidone) of molecular weight about 5,000 to which was grafted side chains of poly (12-hydroxy stearic acid), the weight ratio of the two components being 1:1.

A reaction vessel was charged with a mixture of:

| | | |
|---|---|---|
| aliphatic hydrocarbon | 206.0 | parts |
| stabiliser solution (above) | 5.7 | parts |
| vinyl pyrrolidone | 10.8 | parts |
| azodiisobutyronitrile | 0.5 | parts |

Refluxing was continued for a further 30 minutes, latex cooled and lightly centrifuged to remove some large disperse particles. The disperse particles remaining in the latex were of approximately 0.1–1.0 micron diameter.

To 10 parts of the above latex was added 50 parts of styrene, 4 parts of divinyl benzene and 1.5 parts of azodiisobutyronitrile. This mixture was emulsified using a high-speed stirrer with 265 parts of an aqueous suspending liquid consisting of:

| | | |
|---|---|---|
| 10% solution by weight in water of poly(vinyl alcohol)* | 50.0 | parts |
| 2.5% solution by weight in water of hydroxy ethyl cellulose | 50.0 | parts |
| water | 165.0 | parts |

*approximately 21% residual vinyl acetate units and viscosity of a 4% aqueous solution at 20°C 35–45 centipoise.

Emulsification was continued until dispersed globules of about 8 micron were obtained.

The emulsion so-formed was polymerised in a sealed container at 90°C for three hours, the pressure rising to a maximum of 18 lbs./sq.in. During this time the medium was solidified by polymerisation of monomer and the disperse poly(vinyl pyrrolidone) particles swollen by water imbibed from the aqueous liquid. The resulting granules containing the swollen polymer particles were washed with water and allowed to settle. After several days they were collected by decantation and on drying the vesicle volume was found to be 30.8% of the total granule volume. The granule diameter was 8 micron average and the vesicle diameter estimated from scanning electron microscopy to be in the range of 0.2–1.0 micron.

When the granules were incorporated, by stirring, into a conventional white aqueous latex paint, dry films formed therefrom were smooth, of low gloss and of substantially improved opacity compared with the granules-free paint film.

EXAMPLE 2

Preparation of vesiculated granules of poly(styrene/-divinyl benzene) by an emulsification process using an aqueous swellant and suspending liquid. The swellable disperse polymer particles are self-stabilising in a hydrocarbon liquid.

A 43% by weight of solids dispersion of a graft copolymer in a 1:1 by weight mixture of benzene and toluene was prepared by dispersion polymerisation. The graft copolymer consisted of a backbone of poly(vinyl pyrrolidone) of molecular weight about 5,000 to which was grafted side chains of poly(12-hydroxy stearic acid), the weight ratio of the two polymeric components being 1:1.

To 20 parts of the above copolymer dispersion was added 80 parts of styrene, 5.6 parts of divinyl benzene and 2 parts of azodiisobutyronitrile. The copolymer remained as a stable dispersion in the mixture, which was in turn emulsified, using a high-speed disc stirrer, into an aqueous suspending liquid consisting of 165 parts of water in which was dissolved 1.5 parts of sodium lauryl sulphate and 50 parts of a 10% by weight solution in water of a poly(vinyl alcohol) as used in Example 1.

The above mixture was heated in a closed reaction vessel for three hours to solidify the monomeric medium. After washing the granules so-formed with water they were collected by decantation. The dried granules were of 2–3 micron diameter and comprised 27% by volume of vesicles with a diameter of approximately 0.1 micron.

EXAMPLE 3

Preparation of vesiculated granules of pigmented poly(styrene/divinyl benzene) by an emulsification process using an aqueous swellant and suspending liquid. The medium is soldified by a polymerisation reaction.

To 80 parts of styrene containing 24.3 parts of the stabiliser solution of Example 1 was added 26 parts of pigment grade rutile titanium dioxide. The mixture was milled to give a uniform dispersion of pigment particles of 10 micron diameter, into which 5.6 parts of divinyl benzene and 2 parts of azodiisobutyronitrile were stirred. The paste so-formed was quickly emulsified into an aqueous suspending liquid consisting of 50 parts of a 10% by weight solution in water of a poly(vinyl alcohol) as in Example 1, 50 parts of a 10% by weight solution in water containing 1.5 parts of sodium lauryl sulphate. The polymeric stabiliser formed discrete disperse particles, swollen by imbibed water, within the droplets of solidifiable medium.

The change was heated in a closed container of 90°C for three hours to polymerise the medium, forming grnaules which were washed with water and separated by decanting.

The average diameter of the dried granules was 4 micron, the vesicle volume 14.8% and the average vesicle diameter 0.8–1.5 micron.

EXAMPLE 4

Preparation of vesiculated granules of poly(styrene/-divinyl benzene) in which the vesicles comprise a proportion of pigment particles.

A copolymer of glycidyl methacrylate/vinyl pyrrolidone (3/97 mol. ratio) was prepared using ethylene glycol mono-methyl ether as a solvent. This copolymer was reacted with sufficient methacrylic acid to introduce approximately one polymerisable double bond per polymer chain. Finally the modified copolymer was copolymerised with styrene to form essentially a branched poly(vinyl pyrrolidone)/poly(styrene) copolymer solution.

Pigment grade rutile titanium dioxide was then dispersed in this polymer solution and styrene added causing the poly(vinyl pyrrolidone) chains of the copolymer to collapse around the pigment particles which, however, remained in a state of stable dispersion.

To 90 parts of the above dispersion, which contained 10 parts of pigment and 5 parts of vinyl pyrrolidone copolymer was added 5.6 parts of divinyl benzene and 2 parts of azodiisobutyronitrile. This mixture was emulsified into an aqueous suspending liquid, consisting of 50 parts of a 10% by weight solution in water of poly(vinyl alcohol) as in Example 1, 50 parts of a 2.5% by weight solution in water of hydroxy ethyl cellulose and 165 parts of water, using a high speed stirrer. The vinyl pyrrolidone copolymer particles were swollen by water imbibed from the suspending liquid. Polymerisation of the medium was carried out by heating the batch to 90°C in a closed vessel for three hours. The granules so-formed were washed with water, collected by decanting and dried.

The average diameter of the dried granules was 5 micron, the vesicle volume 20% of the granule volume and the diameter of the vesicles approximately 1.5 micron. Scanning electron micrograph examination of the granules confirmed the presence of pigment particles within the vesicles.

EXAMPLE 5

Preparation of vesiculated granules of poly(styrene/-divinyl benzene) by an emulsification process using an aqueous swellant and suspending liquid. The disperse polymer particles do not in themselves swell in the presence of water but must first be neutralised with a base, when they become waterswellable.

A non-aqueous latex of poly(acrylonitrile/acrylic acid) was prepared by the dispersion of acrylonitrile and acrylic acid in hexane in the presence of a graft copolymer stabiliser used as a 47% by weight solution in a 2:1 by weight mixture of ethyl acetate and n-butyl acetate. The graft copolymer consisted of a poly(methyl methacrylate/methacrylic acid) backbone with a poly(12-hydroxy stearic acid) side chain grafted onto it.

A reaction vessel was charged with a mixture of:

| | | |
|---|---:|---|
| acrylonitrile | 22.50 | parts |
| acrylic acid | 27.50 | parts |
| azodiisobutyronitrile | 0.15 | parts |
| stabiliser solution (above) | 12.80 | parts |
| hexane | 500.00 | parts | which was held at reflux for 45 minutes. A mixture of

| | | |
|---|---:|---|
| acrylonitrile | 202.50 | parts |
| acrylic acid | 247.60 | parts |
| azodiisobutyronitrile | 1.35 | parts |
| stabiliser solution (above) | 115.00 | parts | was added to the refluxing batch at a uniform rate over a period of three hours. Refluxing was continued for a further hour and the batch then cooled. A stable dispersion of polymer particles of approximately 0.2 micron diameter was formed. The disperse polymer particles were neutralised by adding a preferred base, tri-n-butylamine, to the dispersion to convert them to a water-swellable form. (The choice of base is not critical and other bases, especially organic amines, may be used.)

The neutralised swellable latex as prepared above was then used to prepare a number of different vesiculated polymer granules, in the following manner:

a. To 100 parts of styrene, 1 part of stabiliser solution (above), 6 parts of divinyl benzene and 2 parts of azodiisobutyronitrile (thoroughly mixed to dissolve the azodiisobutyronitrile) was added 2 parts of neutralised swellable latex (above) and the resulting mixture emulsified into 368 parts of an aqueous suspending liquid according to Example 1. The emulsion was agitated until disperse droplets of 5 micron diameter were obtained, which took about 10 minutes using a Silverson emulsifier. On contacting with the aqueous suspending liquid the swellable disperse polymer particles imbibed water to form aqueous sacs within the monomer droplets.

The monomer droplets were polymerised to granules by placing the emulsion in a pressure vessel and heating to 80°–90°C at which temperature the azodiisobutyronitrile initiated the polymerisation of the styrene/-divinyl benzene comonomers.

After cooling the polymerised granules were transferred to a large volume of cold water to wash off extraneous material, separated and dried in air. The volume of the vesicles based on the granule volume was 18–20%. The granule diameter was approximately 5 micron and the vesicle diameter was approximately 0.5–1.0 micron. The granules were incorporated into a waterborne latex paint to give smooth, integral, low gloss, white films of high opacity. The paint was applied to a glass panel and compared for opacity with a similar film of a paint devoid of the granules. The scatter coefficients of the paint films were determined using the Kubelka-Munk method. The ratio of this coefficient to the pigment volume concentration of the paint was 240 in the case of the granulecontaining paint and 137 in the case of the granule-free paint.

b. The 100 parts of styrene, 15 parts of stabiliser solution (above), 6 parts divinyl benzene and 2 parts of azodiisobutyronitrile was added 5 parts of neutralised swellable latex (above). 10 parts of water were emulsified into this mixture and the resulting emulsion emulsified into 368 parts of an aqueous suspending liquid according to Example 1. The emulsion was agitated until disperse droplets of 10 micron diameter were obtained, which took about 10 minutes using a Silverson emulsifier. On contacting with the aqueous suspending liquid the swellable disperse polymer particles which already attract the water emulsified into the styrene phase further imbibe water to form aqueous sacs within the monomer droplets. Granules of 10 micron diameter containing 20% by volume of vesicles of 0.5 micron diameter were formed, when polymerisation was carried out by the above method.

c. To 80 parts of styrene, 26 parts of stabiliser solution (above), 4.8 parts divinyl benzene and 1.6 parts of azodiisobutyronitrile was added 7.2 parts of neutralised swellable latex (above) and the resulting mixture emulsified into 504 parts of a water phase containing 1.8 parts of poly(vinyl alcohol), and 4.5 parts of hydroxy ethyl cellulose. The emulsification was carried out using a colloid mill which produced droplets no larger than 5 micron. On contacting with the aqueous phase the swellable disperse polymer particles imbibed water to form aqueous sacs within the monomer droplets. To obtain higher porosities the emulsion was kept for 24 hours before polymerising.

On polymerisation, the mixture yielded vesiculated polymer granules of 5 micron diameter containing 30% by volume of vesicles of 0.3 micron diameter.

EXAMPLE 6

The effect of varying the relative monomer proportions of the water-swellable polymer particles of example 5 on the nature of vesiculated polymer granules prepared therefrom is demonstrated.

By the general method of example 5, four neutralised swellable latices were prepared from the reactants shown in the accompanying table. Each neutralised swellable latex was then used to prepare vesiculated polymer granules by the method of example 5 (c) with the results shown:

A trend toward higher vesicle volumes is apparent at higher acrylic acid/acrylonitrile ratios.

EXAMPLE 7

Preparation of vesiculated granules of poly(methyl methacrylate/divinyl benzene) by an emulsification process using an aqueous swellant and suspending liquid. The medium is solidified by an addition polymeriation reaction.

A non-aqueous latex of poly(vinyl pyrrolidone) was prepared by the dispersion polymerisation of vinyl pyrrolidone in an aliphatic hydrocarbon liquid (boiling point 100°C) in the presence of a graft copolymer stabiliser. The graft copolymer consisted of a backbone of poly(ethyl acrylate/methacrylic acid) (monomer ratios 10:1 by weight) of molecular weight approximately 10,000 to which was grafted side chains of poly(12-hydroxy stearic acid) of molecular weight about 1500, the weight ratio of backbone polymer to side chains being 1:1.

A reaction vessel was charged with a mixture of:

| | | |
|---|---|---|
| aliphatic hydrocarbon | 200.00 | parts |
| stabiliser (above) | 10.00 | parts |
| vinyl pyrrolidone | 50.00 | parts |
| azodiisobutyronitrile | 0.50 | parts | which was refluxed for three hours. A dispersion of poly(vinyl pyrrolidone) of particle diameters 0.01–0.2 micron was formed.

To 4.45 parts of the above dispersion was added 47.5 parts of methyl methacrylate, 2.5 parts of divinyl benzene, 40 parts of a lactic acid stabiliser and 1.6 parts of azodiisobutyronitrile. The lactic acid stabiliser was a graft copolymer consisting of a poly(vinyl pyrrolidone) back bone polymer of molecular weight about 10,000 to which was grafted side chains of poly(lactic acid) of molecular weight approximately 10,000, the weight ratio of side chains to backbone polymer being 1:1. The above mixture was emulsified using a high speed stirrer into an aqueous suspending liquid consisting of 11 parts of a 13.6% by weight solution in water of a poly(vinyl alcohol) as in Example 1, 59 parts of a 2.27% by weight solution in water of hydroxy ethyl cellulose and 130 parts of water. Agitation was continued until disperse globules of 10–25 micron were obtained.

| Acrylic acid/acrylonitrile ratio | 1.36/1 | 2/1 | 2.5/1 | 3/1 |
|---|---|---|---|---|
| | Parts | Parts | Parts | Parts |
| Initial charge | 16.80 | 16.50 | 16.50 | 16.50 |
| acrylonitrile | 54.80 | 33.00 | 41.00 | 41.00 |
| acrylic acid | 0.15 | 0.15 | 0.15 | 0.15 |
| azodiisobutyronitrile | 13.10 | 12.20 | 12.20 | 12.20 |
| stabiliser solution | 500.00 | 500.00 | 500.00 | 500.00 |
| hexane | | | | |
| Added mixture | | | | |
| acrylonitrile | 202.50 | 148.00 | 148.00 | 148.00 |
| acrylic acid | 247.50 | 247.00 | 371.00 | 446.00 |
| azodiisobutyronitrile | 1.35 | 1.35 | 1.35 | 1.35 |
| stabiliser | 117.00 | 109.00 | 109.00 | 109.00 |
| Granules | | | | |
| diameter | 5 micron | 5 micron | 5 micron | 5 micron |
| vesicle diameter | 0.4 " | 0.4 " | 0.3 " | 0.4 " |
| vesicle volume | 12% | 18% | 30% | 20% |

The monomers were polymerised by heating the batch in a sealed container at 90°C for three hours, to form solidified polymer granules. The granules were washed with water, decanted and dried in air. The average granule diameter was 15 micron and comprised 30% by volume of vesicles of from 0.1–1 micron diameter.

EXAMPLE 8

Preparation of vesiculated poly(styrene/divinyl benzene) granules by an emulsification process using an aqueous swellant and suspending liquid. The medium is solidified by an addition polymerisation reaction.

A non-aqueous latex of poly(hydroxy ethyl methacrylate/divinyl benzene) in aliphatic hydrocarbon was prepared by the dispersion polymerisation method of Example 7, replacing the vinyl pyrrolidone of that Example with an equal weight of a mixture of hydroxy ethyl methacrylate and divinyl benzene in the proportion by weight of 10:1. The disperse swellable polymer particles were of from 0.1 to 0.5 micron diameter.

To 10 parts of the above dispersion were added 47.5 parts of styrene, 2.5 parts of divinyl benzene and 4 parts of a supplementary graft-copolymer stabiliser consisting of a poly(hydroxy ethyl methacrylate) polymeric backbone of molecular weight approximately 10,000 to which was grafted side chains of poly (12-hydroxy stearic acid) of molecular weight about 1500, such that the weight ratio of backbone polymer to side chains is 1:1 A stable dispersion of poly(hydroxy ethyl methacrylate, divinyl benzene) in polymerisable monomer was formed.

This mixture was then emulsified into an aqueous suspending liquid and polymerised as described in Example 7.

The dried granules were of approximately 20 micron diameter and comprised 20–30% by volume of vesicles of 0.1–2.0 micron diameter.

Vesiculated granules of the same polymer were prepared in a similar manner using poly(4-vinyl pyridine) as the swellable disperse polymer in place of the poly(hydroy ethyl methacrylate/divinyl benzene) used above. The disperse polymer was prepared in a similar way, but replacing the mixture of hydroxy ethyl methacrylate and divinyl benzene with an equimolar amount of 4-vinyl pyridine. In preparing the granules, the above supplementary graft copolymer stabiliser was modified by replacing the poly(hydroxy ethyl methacrylate) component with poly(4-vinyl pyridine). Additionally the aqueous suspending liquid contained 50 parts of concentrated hydrochloric acid per 200 parts of liquid to facilitate swelling of the disperse polymer.

The average diameter of the dried granules was approximately 20 micron, the vesicle volume 20-30% of the granule volume and the vesicle of 0.1–2.0 micron diameter.

EXAMPLE 9

Preparation of vesiculated cross-linked polyester grnaules by an emulsification process using an aqueous swellant and suspending liquid. The medium comprises an oligomer and polymerisable monomer solidified by an addition polymerisation reaction.

A surface active agent was prepared by emulsion polymerising 40.8 parts of vinyl acetate and 7.0 parts of dimethylaminoethyl methacrylate quaternised with benzyl chloride, in 100.0 parts of water containing 1.6 parts of octyl trimethylammonium bromide. The latex so-formed was coagulated, washed and dried.

A mixture of:

| | | |
|---|---|---|
| surface active agent (above) | 1.2 | parts |
| n-butyl acetate | 20.0 | parts |
| dimethylaminoethyl methacrylate quaternised with benzyl chloride | 4.0 | parts |
| azodiisobutyronitrile | 0.1 | parts | was refluxed in a reaction vessel for one hour to give a latex of swellable poly(quaternised dimethylaminoethyl methacrylate) particles of 0.1–1.0 micron diameter.

To 3.0 parts of the above latex was added 15.0 parts of a 60% by weight solution of a polyester resin in styrene. The polyester resin had been prepared by condensing fumaric acid, phthalic acid and propylene glycol (3:1:4 molar ratio) to an acid value 25 mgm. KOH per gm. benzoyl peroxide (0.4 parts) was added, the mixture emulsified into an aqueous suspending liquid, polymerised and washed by the general method of Example 7.

The dried granules were of approximately 15 micron diameter with a vesicle volume of 20% and vesicle diameters of from 0.1–2.0 micron.

EXAMPLE 10

Preparation of vesiculated granules of a ureaformaldehyde polymer by an emulsification process using a non-aqueous swellant and suspending liquid. The medium is solidified by a condensation reaction.

A reaction vessel was charged with a mixture of:

| | | |
|---|---|---|
| water | 59.90 | parts |
| cetyltrimethyl ammonium bromide | 0.87 | parts |
| 36% by weight solution in ethanol of dimethylaminoethyl methacrylate quaternised with benzyl chloride | 1.82 | parts |
| styrene | 4.60 | parts |
| n-octyl mercaptan | 0.05 | parts |
| azodiisobutyronitrile | 0.05 | parts | and refluxed for 15 minutes. A mixture of:

| | | |
|---|---|---|
| 36% by weight ethanol solution of the above quaternised monomer | 9.11 | parts |
| styrene | 23.00 | parts |
| n-octyl mercaptan | 0.26 | parts |
| azodiisobutyronitrile | 0.26 | parts |
| cetyltrimethyl ammonium bromide | 0.08 | parts | was added to the refluxing batch at a uniform rate over a period of two hours and refluxing continued for a further 30 minutes. A stable latex of swellable disperse polymer of particle diameter approximately 0.2 micron was formed.

A urea-formaldehyde aqueous syrup was prepared by adding 60.0 parts of urea to a solution of 82.5 parts of paraform and 0.5 parts of potassium hydroxide in 100 parts of water and heating the mixture at reflux for 10 minutes. Hydrochloric acid (60 parts of a 1.3 molar solution) was then added to bring the pH to 5, and refluxing continued for two hours. To 35.0 parts of the cooled clear viscous solution obtained was added 15 parts of the above latex dispersion. The mixture was emulsified using a high-speed stirrer into 130 parts of a 37% by weight solution of a long oil alkyd in a mixture of white spirits and xylene. The emulsification was continued until particles of average diameter 20 microns were obtained.

After diluting with 2,000 parts of xylene the emulsion was heated to reflux and water removed in a Dean and Stark separator over two hours. Trichloracetic acid (1.0 part) was added, and reflux and water removal continued for a further two hours. The resulting granules containing the swollen dispersed latex particles were washed with acetone, and dried. The vesicle volume was estimated to be 30%, the average granule diameter was 15 micron, and the maximum vesicle diameter was 1 micron.

EXAMPLE 11

Preparation of vesiculated granules of casein/formaldehyde polymer by an emulsification process using a non-aqueous swellant and suspending liquid.

The granules were prepared by the general method of Example 10 but replacing the urea-formaldehyde syrup of that example with 140 parts of a 14% by weight solution of casein in water containing 1.7 parts of sodium hydroxide. The trichloracetic acid was replaced by 10.0 parts of an aqueous formaldehyde solution containing 40% by weight of formaldehyde.

The dried granules were of about 20 micron diameter and comprised 30% by volume of vesicles with diameters estimated by electron microscopy to be approximately 1 micron maximum.

EXAMPLE 12

Preparation of matt aqueous latex paints containing vesiculated granules prepared according to the process of the invention.

A series of aqueous latex paints was prepared by the following general method, using vesiculated granules as identified hereinunder.

A mixture of 12.1 parts of pigment grade rutile titanium dioxide and 0.06 part of sodium hexametaphosphate was added to 25.0 parts of an aqueous slurry of vesiculated polymer granules containing 18.0% by weight of granules and stirred with a high-speed mechanical disc agitator for 30 minutes. The stirring speed was then lowered to reduce aeration of the mixture and 17.2 parts of a 46.5% by weight commercial acrylic copolymer aqueous latex added. The granules used in each of the paint samples so-prepared were as follows:

| Sample No. | Granules from Example | Avg. Dia. in Micron |
|---|---|---|
| (a) | 2* | 0.6 |
| (b) | 2 | 2.0 |
| (c) | 3 | 4.0 |
| (d) | 4 | 5.0 |
| (e) | 1 | 8.0 |

*As for Example 2 but emulsified at higher speed before solidification of the medium.

Films of each paint were applied by brush to glass and a spreading rate of approximately 600 sq.ft. per gallon, and allowed to dry in air at 25°C and 50% relative humidity. All paints formed coherent, dry films in less than one hour.

Paint (a) formed a glossy film and that of paint (b) a somewhat lower semi-gloss film. The other paints formed films of decreasing gloss levels as the average diameter of the granules increased, paint (e) forming a uniform, matt film.

EXAMPLE 13

Preparation of non-aqueous paints comprising vesiculated polymer granules prepared by the process of the invention.

Two paint compositions were prepared by the following general method using granules prepared according to Examples 9 and 10 respectively.

Rutile titanium dioxide was dispersed to a pigment volume concentration (on solids) of 12% into a solution in a 1:1 mixture of toluene and acetone of a 98/2 methyl methacrylate/methacrylic acid copolymer solution (20 parts of a 40% solution. Dry vesiculated polymer granules (5 parts), acetone (10 parts), toluene (10 parts) and n-butyl benzyl phthalate (5 parts) were added to the dispersion and the aggregates dispersed by stirring at high-speed with sand.

After removal of the sand, the compositions were sprayed onto Morest charts and after drying at room temperature for one hour the coated charts were baked at 150°C for 30 minutes.

Each paint produced a uniform, satin film. The films were compared with the films of control paints prepared and tested in the same way but replacing the vesiculated granules with an equal volume of granules of the same size and composition, but free of vesicles. In each case the films comprising vesiculated granules were of substantially higher opacity than the control films.

EXAMPLE 14

Preparation of a vesiculated poly(styrene) moulding.

A latex of poly(vinyl pyrrolidone) in an aliphatic hydrocarbon liquid was prepared by the method described in Example 7.

To 2.5 parts of the above latex was added 25.0 parts of styrene and 2.5 parts of a supplementary stabiliser consisting of a graft copolymer of poly (12-hydroxy stearic acid) chains of molecular weight about 1,700 grafted to a backbone of poly(vinyl pyrrolidone) of molecular weight approximately 10,000, the weight ratio of side chains to backbone polymer being 1:1.

The dispersion of poly(vinyl pyrrolidone) particles in styrene so-formed was poured onto water and allowed to stand for several days, during which time the disperse polymer had become swollen by the water. The styrene phase was then separated from the water layer and polymerised in a closed mould under a nitrogen blanket by exposure to radio-active cobalt.

An opaque poly(styrene) moulding was obtained which on exposure to air decreased in density as water diffused from the mass, forming vesicles therein. The vesicle volume was estimated to be about 10% of the total casting volume and the vesicles were of 0.1–1.0 micron diameter.

EXAMPLE 15

Preparation of vesiculated polymer coating films on a substrate.

A coating composition was prepared by dissolving 24.0 parts of poly(methyl methacrylate), β0.5 part of (solid basis) of the poly(vinyl pyrrolidone) latex prepared in Example 6 and 2.5 parts of the supplementary lactic acid stabiliser of that example in 51 parts of ethyl acrylate.

Films of the composition were applied with an applicator blade of 200 m$\mu$. clearance to plate glass panels.

One panel was placed in an autoclave in an atmosphere saturated with water vapour and held at a pressure of 20 p.s.i. and a temperature rising from 60°–120°C for 30 minutes to swell the disperse polymer particles. The film became hard and opaque. When it was subsequently dried in air the opacity increased as water absorbed by the poly (vinyl pyrrolidone) evaporated, the swollen polymer chains collapsed and gaseous vesicles of less than 1 micron diameter formed in the film.

As an alternative method of swelling the dispersed poly(vinyl pyrrolidone) particles a panel coated with an air-dried and slightly translucent film of the coating was immersed for several hours in a 4:1 mixture (by weight) of water and acetone. On removal from the bath and allowing to dry in air, the film became hard and opaque.

We claim:

1. A process of preparing vesiculated polymer which comprises converting to solid non-porous polymer the liquid medium of a dispersion in which particles of another polymer are dispersed, the dispersed particles being swollen by a liquid swellant, whereby there is formed solid polymer containing said swollen polymer particles, and thereafter removing at least part of said swellant from said swollen polymer particles to form a plurality of isolated vesicles within a matrix of solid non-porous polymer.

2. A process of preparing vesiculated polymer in granular form which comprises dispersing, in a suspending liquid, a liquid medium in which are dispersed particles of a first polymer, said first polymer particles being swollen by a liquid swellant, converting said liquid medium to solid, non-porous granules of a second polymer, and at least partially removing said swellant from said swollen polymer particles to form in said granules a plurality of isolated vesicles within a matrix of solid non-porous polymer.

3. A process according to claim 1 in which the liquid medium is a solution of a polymer in a solvent and is converted to solid polymer by removal therefrom of the solvent for the polymer.

4. A process according to claim 1 in which the liquid medium comprises polymerisable material which is converted to solid polymer by a polymerisation reaction.

5. A process according to claim 4 in which the liquid medium is converted to solid polymer by a polymerisation reaction producing cross-linked polymer.

6. A process according to claim 2 in which the liquid medium comprises polymerisable material which is converted to solid polymer by a polymerisation reaction.

7. A process according to claim 6 in which the liquid medium is converted to solid polymer by a polymerisation reaction producing cross-linked polymer.

* * * * *